United States Patent
Li et al.

(10) Patent No.: US 12,351,515 B2
(45) Date of Patent: Jul. 8, 2025

(54) TARGETED CORROSION INHIBITOR FOR MARINE REINFORCED CONCRETE, AND PREPARATION AND APPLICATION THEREOF

(71) Applicant: Sun Yat-sen University, Guangzhou (CN)

(72) Inventors: Weihua Li, Guangzhou (CN); Mengzhu Chen, Guangzhou (CN); Haibing Zheng, Guangzhou (CN)

(73) Assignees: Henan academy of sciences, Zhengzhou (CN); Institute of Chemistry, Henan Academy of Sciences, Zhengzhou (CN)

( * ) Notice: Subject to any disclaimer, the term of this patent is extended or adjusted under 35 U.S.C. 154(b) by 548 days.

(21) Appl. No.: 17/717,255

(22) Filed: Apr. 11, 2022

(65) Prior Publication Data

US 2022/0234953 A1    Jul. 28, 2022

(51) Int. Cl.
| | |
|---|---|
| C04B 22/06 | (2006.01) |
| C04B 103/60 | (2006.01) |
| C04B 111/00 | (2006.01) |
| C04B 111/26 | (2006.01) |

(52) U.S. Cl.
CPC ........ C04B 22/064 (2013.01); *C04B 2103/60* (2013.01); *C04B 2111/00008* (2013.01); *C04B 2111/26* (2013.01)

(58) Field of Classification Search
CPC .............. C04B 22/064; C04B 2103/60; C04B 2111/00008; C04B 2111/26; C04B 28/02; C04B 20/0016; C04B 2111/24; C04B 22/06; C04B 2103/61; C01G 5/006
See application file for complete search history.

(56) References Cited

FOREIGN PATENT DOCUMENTS

| CN | 105174773 A | * 12/2015 | ............ C04B 24/04 |
| CN | 111847957 A | 10/2020 | |
| CN | 112915960 A | 6/2021 | |

OTHER PUBLICATIONS

Zuo et al. Preparation of MgAl layered double hydroxide intercalated with nitrite ions and corrosion protection of steel bars in simulated carbonated concrete pore solution. Corrosion Science. 152, 120-129. (Year: 2019).*
Chen et al. Silver nanoparticles deposited layered double hydroxide nanoporous coatings with excellent antimicrobial activities. Advanced Functional Materials. 22, 780-787. (Year: 2012).*
CN 105174773-A_Machine_Translation.*

* cited by examiner

*Primary Examiner* — David P Turocy
*Assistant Examiner* — Anastasia A. Kuvayskaya

(57) ABSTRACT

A targeted corrosion inhibitor for marine reinforced concrete, and a preparation and application thereof. The targeted corrosion inhibitor is a nano silver-loaded nitrite-intercalated layered double hydroxide. The targeted corrosion inhibitor is prepared based on interlayer ion exchangeability of layered double hydroxides and specific recognition of $Ag^+$ to chloride ions.

7 Claims, 3 Drawing Sheets

TARGETED CORROSION INHIBITOR FOR MARINE REINFORCED CONCRETE, AND PREPARATION AND APPLICATION THEREOF

CROSS-REFERENCE TO RELATED APPLICATIONS

This application claims the benefit of priority from Chinese Patent Application No. 202111047132.6, filed on Sep. 8, 2021. The content of the aforementioned application, including any intervening amendments thereto, is incorporated herein by reference in its entirety.

TECHNICAL FIELD

This application relates to building materials, and more particularly to a targeted corrosion inhibitor for marine reinforced concrete, and a preparation and application thereof.

BACKGROUND

China is a country of vast maritime territory and abundant marine resources. However, during the marine construction, bridges, ships and marine resource development platforms always suffer the corrosion of reinforcing bars. The corrosion of reinforced concrete is triggered by free chloride ions, which accounting for 88% of the total amount of corrosive anions in seawater. The chloride ions will destroy an inherent corrosion-resistant passive film on the steel, resulting in a corrosion rate at least 1000 times higher than the original rate (0.1 μm/a). Therefore, it is of great significance to effectively relieve the chloride ion corrosion in reinforced concrete structures, so as to prolong the service life of concrete structures, meet the social requirements and promote the economic development.

Layered double hydroxides (LDHs), also known as hydrotalcite materials, are a new type of multifunctional two-dimensional nanomaterials with the main structure composed of two metal hydroxides. The LDHs have an interlayer ion exchangeability and structure memory effect. In addition, the LDHs are isomeric with a hydration product (AFm phase) of the cement, and have good compatibility with the concrete matrix. Therefore, the LDHs have been widely used in reinforced concrete structures. Nevertheless, traditional LDHs cannot specifically recognize chloride ions due to the presence of $OH^-$ and $SO_4^{2-}$ in the concrete, which bring competitive adsorption with respect to $Cl^-$. The commercially available organic corrosion inhibitors that can adsorb chloride ions will be degraded to be ineffective due to the concrete hydration. A combination of the LDHs with a corrosion inhibitor may simultaneously enable the specific identification of chloride ions and corrosion inhibition. Therefore, it is necessary to develop a method to effectively combine the LDHs with a corrosion inhibitor to prepare a new type of targeted corrosion inhibitors for the marine reinforced concrete.

SUMMARY

In order to overcome the above-mentioned defects of the prior art, the present disclosure provides a method for preparing a targeted corrosion inhibitor for marine reinforced concrete, which can specifically recognize chloride ions. Even in the presence of multiple anions, the corrosion inhibitor of the disclosure still has a high chloride adsorbing capacity. In addition, the targeted corrosion inhibitor can also slowly release corrosion-resistant nitrite anions while adsorbing chloride ions, effectively prolonging the corrosion inhibiting effect on the reinforcing bars in the concrete. Therefore, the targeted corrosion inhibitor is promising to be applied to the protection of the marine reinforced concrete.

The technical solutions of the present disclosure are described as follows.

In a first aspect, the present disclosure provides a targeted corrosion inhibitor for marine reinforced concrete, wherein the targeted corrosion inhibitor is a nano silver-loaded nitrite-intercalated layered double hydroxide.

In some embodiments, the nitrite-intercalated layered double hydroxide is a nitrite-intercalated Ca—Al layered double hydroxide.

In a second aspect, the present disclosure provides a method for protecting marine reinforced concrete, comprising:
  introducing the targeted corrosion inhibitor mentioned above into the marine reinforced concrete.

In some embodiments, the targeted corrosion inhibitor is added into the marine reinforced concrete.

In a third aspect, the present disclosure provides a method for preparing the targeted corrosion inhibitor mentioned above, comprising:
  (S1) dissolving sodium carbonate, calcium hydroxide, sodium metaaluminate, silver nitrate and sodium nitrite in boiling water, respectively, to obtain a first solution, a second solution, a third solution, a fourth solution and a fifth solution;
  (S2) mixing the first solution, the second solution and the third solution followed by pH adjustment to obtain a reaction solution; and stirring the reaction solution;
  (S3) subjecting the reaction solution to a hydrothermal reaction followed by vacuum filtration to obtain a first filter cake; and washing, drying and grinding the first filter cake to obtain a Ca-layered double hydroxide (Ca-LDH);
  (S4) calcining the Ca-LDH obtained in step (S3) to obtain a Ca-layered double oxide (Ca-LDO);
  (S5) dissolving the Ca-LDO in the fourth solution followed by pH adjustment, stirring and vacuum filtration to obtain a second filter cake; and washing and drying the second filter cake to obtain an Ag/Ca-layered double oxide (Ag/Ca-LDO); and
  (S6) dissolving the Ag/Ca-LDO in the fifth solution followed by stirring at room temperature for 24-48 h and vacuum filtration to obtain a third filter cake; and washing and drying the third filter cake to obtain the targeted corrosion inhibitor.

On one hand, based on the structure memory effect of the layered double hydroxides, anions capable of specifically recognizing chloride ions are loaded on the layers, and a corrosion inhibitor is loaded between the layers through intercalation reconstruction, so as to effectively avoid the loss of the corrosion inhibitor while targetedly binding the chloride ion. On the other hand, based on the interlayer anion exchangeability of the layered double hydroxides, the targeted corrosion inhibitor can release nitrates with corrosion-inhibiting effect while absorbing harmful chloride ions, so as to provide a dual protection effect on the reinforcing bars in the concrete. The targeted corrosion inhibitor has an excellent anti-corrosion performance. In addition, the targeted corrosion inhibitor is isomeric with a hydration product of the cement, and has no adverse effect on the concrete matrix. Therefore, the targeted corrosion inhibitor is highly potential to be doped in the marine reinforced concrete to play an anti-corrosion role.

In some embodiments, in step (S1), a concentration of the first solution is 0.2-0.5 mol/L, preferably 0.25 mol/L; a concentration of the second solution is 1-3 mol/L, preferably 2.10 mol/L; a concentration of the third solution is 0.25-1.5 mol/L, preferably 1.36 mol/L; a concentration of the fourth solution is 0.1-0.5 mol/L, preferably 0.1 mol/L; and a concentration of the fifth solution is 0.5-2.0 mol/L, preferably 0.41 mol/L.

In some embodiments, in step (S2), a volume ratio of the first solution to the second solution to the third solution is 2:1:1.

In some embodiments, in step (S3), the hydrothermal reaction is performed at 80-120° C. for 24-48 h, preferably at 120° C. for 24 h.

In some embodiments, in step (S4), the Ca-LDH is calcined at 500-900° C. for 3-6 h, preferably at 900° C. for 3 h.

In some embodiments, in step (S5), a ratio of a weight of the Ca-LDO to a volume of the fourth solution is (0.5-1.0) g:40 mL, preferably 1.0 g:40 mL.

In some embodiments, in step (S6), a ratio of a weight of the Ag/Ca-LDO to the fifth solution is (0.5-1.5) g:200 mL, preferably 1.0 g:200 mL.

In some embodiments, in step (S2), the pH adjustment is performed to reach a pH of 12-13, preferably 12; and in step (S5), the pH adjustment is performed to reach a pH of 9-10, preferably 9.

In some embodiments, in step (S2), the reaction solution is stirred at room temperature for 0.5-2 h, preferably for 1 h; and in step (S5), the stirring is performed at 45-55° C. for 24-48 h, preferably at 50° C. for 24 h.

In some embodiments, in step (S3), the first filter cake is washed with water three times, and then with ethanol three times; in step (S5), the second filter cake is washed with water three times, and then with ethanol three times; and in step (S6), the third filter cake is washed with water three times, and then with ethanol three times.

In some embodiments, in step (S3), the first filter cake is ground into 200 mesh.

In some embodiments, in step (S3), the drying is performed at 50° C. under vacuum for 48 h; in step (S5), the drying is performed at 50° C. under vacuum for 24 h; and in step (S6), the drying is performed at 45° C. under vacuum for 48 h.

The beneficial effects of the present disclosure are described as follows.

The targeted corrosion inhibitor provided herein is a nano silver-loaded nitrite-intercalated layered double hydroxide. The targeted corrosion inhibitor can release nitrates with corrosion inhibiting effect for inhibiting the corrosion of the reinforcing bars in the concrete while targetedly absorbing chloride ions, providing a dual protection effect. In addition, the corrosion inhibitor loaded between the layers will not experience a loss due to the concrete hydration. The targeted corrosion inhibitor exhibits an excellent anti-corrosion performance even in the presence of various anions, and is isomeric with a hydration product of the cement, and thus has no adverse effect on the concrete matrix. Therefore, the targeted corrosion inhibitor has a promising application prospect, and high economic and social benefits.

BRIEF DESCRIPTION OF THE DRAWINGS

FIG. 3A: Nyquist diagram; and FIG. 3B: Bode diagram.

DETAILED DESCRIPTION OF EMBODIMENTS

Figure 1:
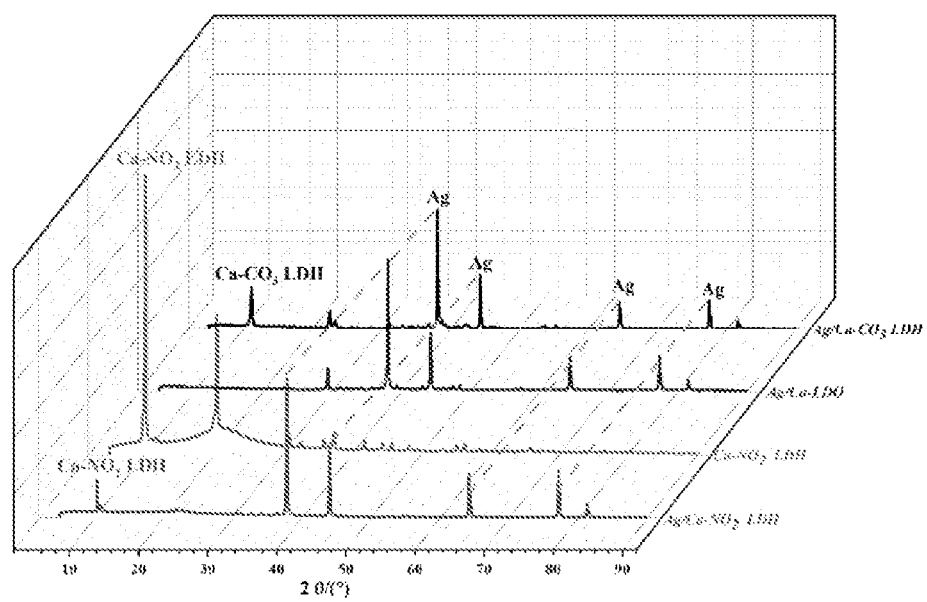
FIG. 1 illustrates X-ray diffraction (XRD) patterns of Ag/Ca—$NO_2$ LDH prepared in Example 1 and Ag/Ca-LDO prepared in Comparative Example 1.

The present disclosure will be further described below with reference to the embodiments. It should be noted that the embodiments are merely illustrative of the present disclosure, and not intended to limit the present disclosure. In addition, the technical features in various embodiments of the present disclosure described below can be combined with each other in the absence of contradiction.

Unless otherwise specified, the experimental methods used herein are conventional methods, and the experimental materials used herein are commercially available.

Example 1 Preparation of a Targeted Corrosion Inhibitor for Marine Reinforced Concrete The targeted corrosion inhibitor was a nano silver-loaded nitrite-intercalated layered double hydroxide, that was, Ag/Ca—$NO_2$ LDH. The preparation of the targeted corrosion inhibitor was performed as follows.

(1) Preparation of a Calcium-Aluminum Layered Double Oxide Ca-LDO (101) 2.65 g of sodium carbonate was dissolved into 100 mL of boiling distilled water, and was ultrasonicated for 5 min to obtain a first solution; 7.78 g of calcium hydroxide was dissolved into 50 mL of boiling distilled water, and was ultrasonicated for 10 min to obtain a second solution; and 5.56 g of sodium metaaluminate was dissolved into 50 mL of boiling distilled water, and was ultrasonicated for 5 min to obtain a third solution.

(102) The first solution, and the second solution and the third solution were evenly mixed and adjusted to pH 12 with a 2 mol/L sodium hydroxide solution to obtain a reaction solution. The reaction solution was stirred at room temperature and 1800 r/min for 1 h.

(103) The reaction solution was transferred into a reaction kettle, and subjected to hydrothermal reaction in an oven at 120° C. for 24 h. The reaction mixture was subjected to vacuum filtration to collect a filter cake, which was rinsed sequentially with deionized water three times, and anhydrous ethanol three times, dried under vacuum at 50° C. for 48 h and ground into 200-mesh particles, so as to obtain a Ca-layered double hydroxide (Ca-LDH), also known as Ca—$CO_3$ LDH.

(104) The Ca-LDH was calcined in a muffle furnace at 900° C. for 3 h to obtain a layered double oxide Ca-LDO.

(2) Preparation of a Nano Silver-Loaded Layered Double Oxide Ag/Ca-LDO (201) 1.7 g of silver nitrate was dissolved into 100 mL of boiling distilled water, and was ultrasonicated for 5 min to obtain a fourth solution.

(202) 40 mL of the fourth solution was added with 1 g of the Ca-LDO, adjusted to pH 9 with aqueous ammonia, stirred at 1800 r/min and 50° C. in a water bath for 24 h, and then subjected to vacuum filtration to collect a filter cake. The filter cake was rinsed sequentially with deionized water three times, and anhydrous ethanol three times, and subjected to vacuum drying in an oven at 50° C. for 24 h to obtain a solid powder Ag/Ca-LDO.

(3) Preparation of a Nano Silver-Loaded Nitrite-Intercalated Layered Double Hydroxide Ag/Ca—NO$_2$ LDH
  (301) 6.9 g of sodium nitrite was dissolved in 200 mL of boiling distilled water, and was ultrasonicated for 5 min to obtain a fifth solution.
  (302) 200 mL of the fifth solution was added with 1 g of the Ag/Ca-LDO, stirred at room temperature and 1800 r/min for 24 h, and then subjected to vacuum filtration to collect a filter cake. The filter cake was rinsed sequentially with deionized water three times, and anhydrous ethanol three times, and subjected to vacuum drying in an oven at 45° C. for 48 h to obtain a solid powder Ag/Ca—NO$_2$ LDH.

Example 2 Preparation of a Targeted Corrosion Inhibitor for Marine Reinforced Concrete The preparation method used herein was basically the same as that adopted in Example 1 except that in step (302), after added with 1 g of the Ag/Ca-LDO, the fifth solution was stirred at room temperature and 1800 r/min for 48 h.

Example 3 Preparation of a Targeted Corrosion Inhibitor for Marine Reinforced Concrete The preparation method used herein was basically the same as that adopted in Example 1 except that in step (301), 13.8 g of sodium nitrite was dissolved in 200 mL of boiling distilled water, and was ultrasonicated for 5 min to obtain a fifth solution.

Comparative Example 1 Preparation of Ag-Loaded Calcium-Aluminum Layered Double Oxide Ag/Ca-LDO The prepared method used herein was basically the same as the steps (1)-(2) adopted in Example 1.

Comparative Example 2 Preparation of Layered Double Hydroxide Ca—NO$_2$ LDH 23.62 g of Ca(NO$_3$)$_2$·4H$_2$O and 18.75 g of AlNO$_3$·9H$_2$O were dissolved into 200 mL of boiling distilled water, and were ultrasonicated for 5 min to obtain a solution A. 13.8 g of NaNO$_2$ and 12 g of NaOH were dissolved in 100 mL of boiling distilled water, and were ultrasonicated for 5 min to obtain a solution B. The solution A and the solution B were mixed, stirred at room temperature for 24 h, and then subjected to vacuum filtration to collect a filter cake, which was rinsed sequentially with deionized water three times and anhydrous ethanol three times, and subjected to vacuum drying in an oven at 45° C. for 48 h to obtain a solid powder Ca—NO$_2$ LDH.

Experimental Example 1 X-Ray Diffraction (XRD) Analysis

Structures of the Ag/Ca—NO$_2$ LDH prepared in Example 1, the Ag/Ca-LDO prepared in Comparative Example 1, a precursor Ca—CO$_3$ LDH and a precursor Ca—NO$_2$ LDH prepared in Comparative Example 2 were analyzed by XRD. In FIG. 1, Ag/Ca-LDO and Ag/Ca—NO$_2$ LDH showed an obvious characteristic diffraction peak of Ag, indicating that Ag ions were successfully loaded. Compared with Ag/Ca-LDO, the Ag/Ca—NO$_2$ LDH prepared in Example 1 showed an obvious characteristic diffraction peak of LDH in a Ca—NO$_2$ LDH structure, indicating that based on a structure memory effect of the Ag/Ca-LDO, the Ag/Ca—NO$_2$ LDH, that was, the nano silver-loaded nitrite-intercalated layered double hydroxide, was successfully prepared.

Experimental Example 2 Evaluation of Chloride Ion Binding Capacity

A saturated solution of calcium hydroxide with pH of 12.5 was used as a simulated concrete pore solution. The saturated solution was respectively added with sodium chloride solutions of different concentrations at 5, 10, 20, 40 and 80 mmol/L, to obtain test solutions. 0.5 g of the Ag/Ca—NO$_2$ LDH prepared in Examples 1-3 and 0.5 g of the Ag/Ca-LDO of Comparative Example 1 were added into 50 mL of each test solution, placed into a sealed bottle with a capacity of about 100 mL, and continuously stirred for 24 h. A Langmuir model and a Freundlich model were used for fitting.

Figure 2:
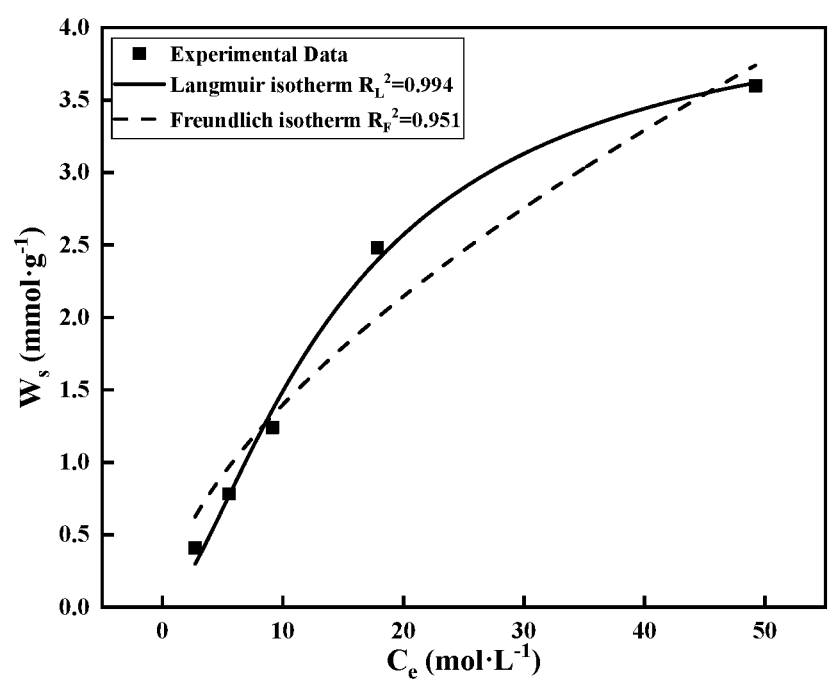
FIG. 2 depicts adsorption isotherms of chloride ions on the Ag/Ca—$NO_2$ LDH prepared in Example 1.

According to adsorption isotherms of chloride ions shown in FIG. 2, the measured experimental data was more in line with the Langmuir model. It was obtained through the fitting that a saturated adsorption capacity of the Ag/Ca—NO$_2$ LDH prepared in Example 1 to chloride ions in the simulated concrete pore solution was 4.207 mmol/g; a saturated adsorption capacity of the Ag/Ca—NO$_2$ LDH prepared in Example 2 to chloride ions in the simulated concrete pore solution was 4.103 mmol/g; a saturated adsorption capacity of the Ag/Ca—NO$_2$ LDH prepared in Example 3 to chloride ions in the simulated concrete pore solution was 4.089 mmol/g; and a saturated adsorption capacity of the Ag/Ca-LDO prepared in Comparative Example 1 to chloride ions in the simulated concrete pore solution was 4.59 mmol/g. The chloride binding capacity of the Ag/Ca—NO$_2$ LDH was a little less than that of the Ag/Ca-LDO, but was still desirable.

Experimental Example 3 Electrochemical Analysis

A saturated solution of calcium hydroxide with pH of 12.5 was used as a simulated concrete pore solution. A 3.5 wt % NaCl solution was added to the simulated concrete pore solution, and was stirred for evenly mixing, so as to obtain an electrolyte solution to simulate a corrosion of chloride salts in seawater. 100 mL of the electrolyte solution was taken for later use. The Ag/Ca—NO$_2$ LDH prepared in Example 1 was added into the electrolyte solution according to an addition amount of 1 g/L, and was marked as an Ag/Ca—NO$_2$ LDH group. The Ag/Ca-LDO prepared in Comparative Example 1 was added into the electrolyte solution according to addition amount of 1 g/L, and was marked as an Ag/Ca-LDO group. The simulated concrete pore solution (electrolyte) without any corrosion inhibitor was used as a reference group. Q235 carbon steel bars (f10 mm*5 mm) were subjected to a pretreatment before a corrosion test. Specifically, the Q235 carbon steel bars were ultrasonicated using anhydrous ethanol to remove surface impurities, and a copper wire was welded to a side of each Q235 carbon steel bar after the Q235 carbon steel bars were dried. Each Q235 carbon steel bar was then sealed in a polyvinyl chloride (PVC) pipe using an epoxy resin. After the epoxy resin was completely cured, an exposed surface of each Q235 carbon steel bar was polished with a sandpaper (400-3000 mesh), and then washed with anhydrous ethanol. The Q235 carbon steel bars were then immersed into the simulated concrete pore solution of a blank group for passivation for 14 days. Passivated Q235 carbon steel bars were than immersed into the Ag/Ca—NO$_2$ LDH group, the Ag/Ca-LDO group and the reference group for 48 h, respectively. A CHI660E electrochemical workstation (CH Instruments Ins., US) was used to perform an electrochemical impedance test, and a three-electrode system was adopted, in which each Q235 carbon steel bar was used as a working electrode; a platinum sheet was used as an auxiliary electrode; and a saturated calomel electrode was used as a reference electrode).

Figure 3A:
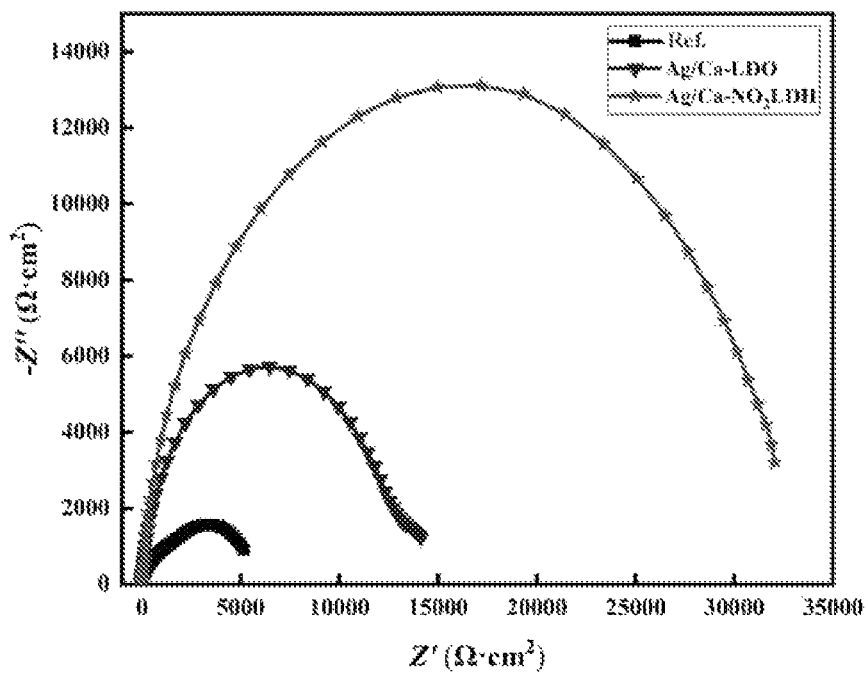
FIGS. 3A-3B show electrochemical impedance spectra of reinforcing bars in different groups after 48-h immersion, where
Figure 3B:
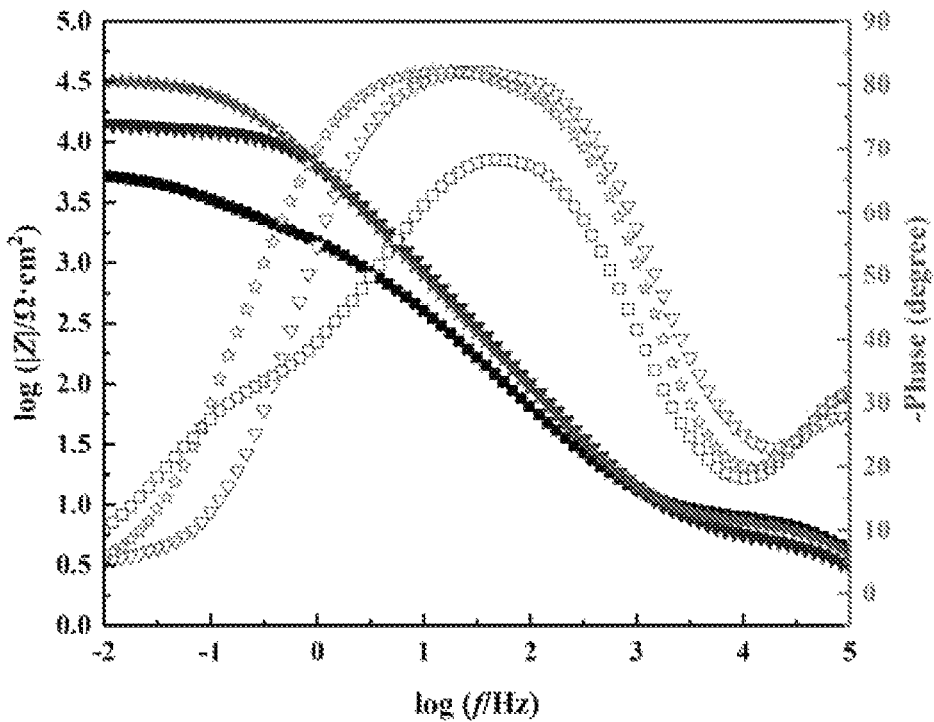

FIGS. 3A-3B showed electrochemical impedance spectra of Q235 carbon steel bars that had been immersed in each group for 48 h. FIG. 3A was a Nyquist diagram of the electrochemical impedance spectra; and FIG. 3B was a Bode diagram of the electrochemical impedance spectra. The Nyquist diagram was composed of an imaginary part of impedance and a real part of the impedance, and a corrosion performance of each Q235 carbon steel bar was determined according to a radius of a capacitive resistance arc that a larger radius of the capacitive resistance arc indicated a higher corrosion resistant of the Q235 carbon steel bar. In the Bode diagram, a phase angle was used to determine the corrosion of the Q235 carbon steel bar that a larger phase angle indicated a higher corrosion resistant of the Q235 carbon steel bar. As shown in FIGS. 3A-3B, the Q235 carbon steel bar immersed in the reference group had a small radius of the capacitive resistance arc and a small phase angle, indicating that without adding a corrosion inhibitor, the Q235 carbon steel bar would corrode quickly under corrosion of $Cl^-$ and a polarization resistance would decrease rapidly. With the addition of the Ag/Ca-LDO prepared in Comparative Example 1, the Q235 carbon steel bar showed a larger radius of the capacitive resistance arc than that in the reference group. With the addition of the Ag/Ca—$NO_2$ LDH prepared in Example 1, the Q235 carbon steel bar showed a much larger radius of the capacitive resistance arc and phase angle than those in the reference group and the Ag/Ca-LDO group, indicating that the Ag/Ca—$NO_2$ LDH provided herein can significantly improve the corrosion resistance of reinforcing bars, and had a much better performance than that of the Ag/Ca-LDO.

Accordingly, the targeted corrosion inhibitor provided herein is a nano silver-loaded nitrite-intercalated layered double hydroxide. Based on inter-layer ion exchangeability of the layered double hydroxides and specific recognition of $Ag^+$ to chloride ions, the targeted corrosion inhibitor provided herein can release nitrite for inhibiting corrosion while binding the infiltrating chloride ions, so as to provide the reinforcing bar with a double protection effect. In addition, since the targeted corrosion inhibitor is isomeric with a hydration product of the cement, the targeted corrosion inhibitor has no adverse effect on the concrete matrix and has excellent anti-corrosion performance.

The embodiments provided herein are illustrative of the present disclosure, and not intended to limit the present disclosure. Variations, replacements and modifications made by those skilled in the art without departing from the spirit of the present disclosure should fall within the scope of the present disclosure defined by the appended claims.

What is claimed is:

1. A method for preparing a targeted corrosion inhibitor, the targeted corrosion inhibitor being a nano silver-loaded nitrite-intercalated Ca—Al layered double hydroxide, the method comprising:
(S1) dissolving sodium carbonate, calcium hydroxide, sodium metaaluminate, silver nitrate and sodium nitrite in boiling water, respectively, to obtain a first solution, a second solution, a third solution, a fourth solution and a fifth solution;
(S2) mixing the first solution, the second solution and the third solution followed by pH adjustment to obtain a reaction solution; and stirring the reaction solution;
(S3) subjecting the reaction solution to a hydrothermal reaction followed by vacuum filtration to obtain a first filter cake; and washing, drying and grinding the first filter cake to obtain a Ca-layered double hydroxide (Ca-LDH);
(S4) calcining the Ca-LDH obtained in step (S3) to obtain a Ca-layered double oxide (Ca-LDO);
(S5) dissolving the Ca-LDO in the fourth solution followed by pH adjustment, stirring and vacuum filtration to obtain a second filter cake; and washing and drying the second filter cake to obtain an Ag/Ca-layered double oxide (Ag/Ca-LDO); and
(S6) dissolving the Ag/Ca-LDO in the fifth solution followed by stirring at room temperature for 24-48 h, and vacuum filtration to obtain a third filter cake; and washing and drying the third filter cake to obtain the targeted corrosion inhibitor.

2. The method of claim 1, wherein in step (S1), a concentration of the first solution is 0.2-0.5 mol/L; a concentration of the second solution is 1-3 mol/L; a concentration of the third solution is 0.25-1.5 mol/L; a concentration of the fourth solution is 0.1-0.5 mol/L; and a concentration of the fifth solution is 0.5-2.0 mol/L.

3. The method of claim 1, wherein in step (S2), a volume ratio of the first solution to the second solution to the third solution is 2:1:1.

4. The method of claim 1, wherein in step (S3), the hydrothermal reaction is performed at 80-120° C. for 24-48 h.

5. The method of claim 1, wherein in step (S4), the Ca-LDH is calcined at 500-900° C. for 3-6 h.

6. The method of claim 1, wherein in step (S5), a ratio of a weight of the Ca-LDO to a volume of the fourth solution is 0.5-1.0 g:40 mL.

7. The method of claim 1, wherein in step (S6), a ratio of a weight of the Ag/Ca-LDO to the fifth solution is 0.5-1.5 g:200 mL.

* * * * *